Nov. 28, 1933.    E. PICK    1,937,324
WATER TREATING APPARATUS
Filed Sept. 24, 1930    6 Sheets-Sheet 1

Inventor
Eric Pick

By K. P. McElroy
Attorney

Nov. 28, 1933.　　　　　E. PICK　　　　　1,937,324
WATER TREATING APPARATUS
Filed Sept. 24, 1930　　6 Sheets-Sheet 2
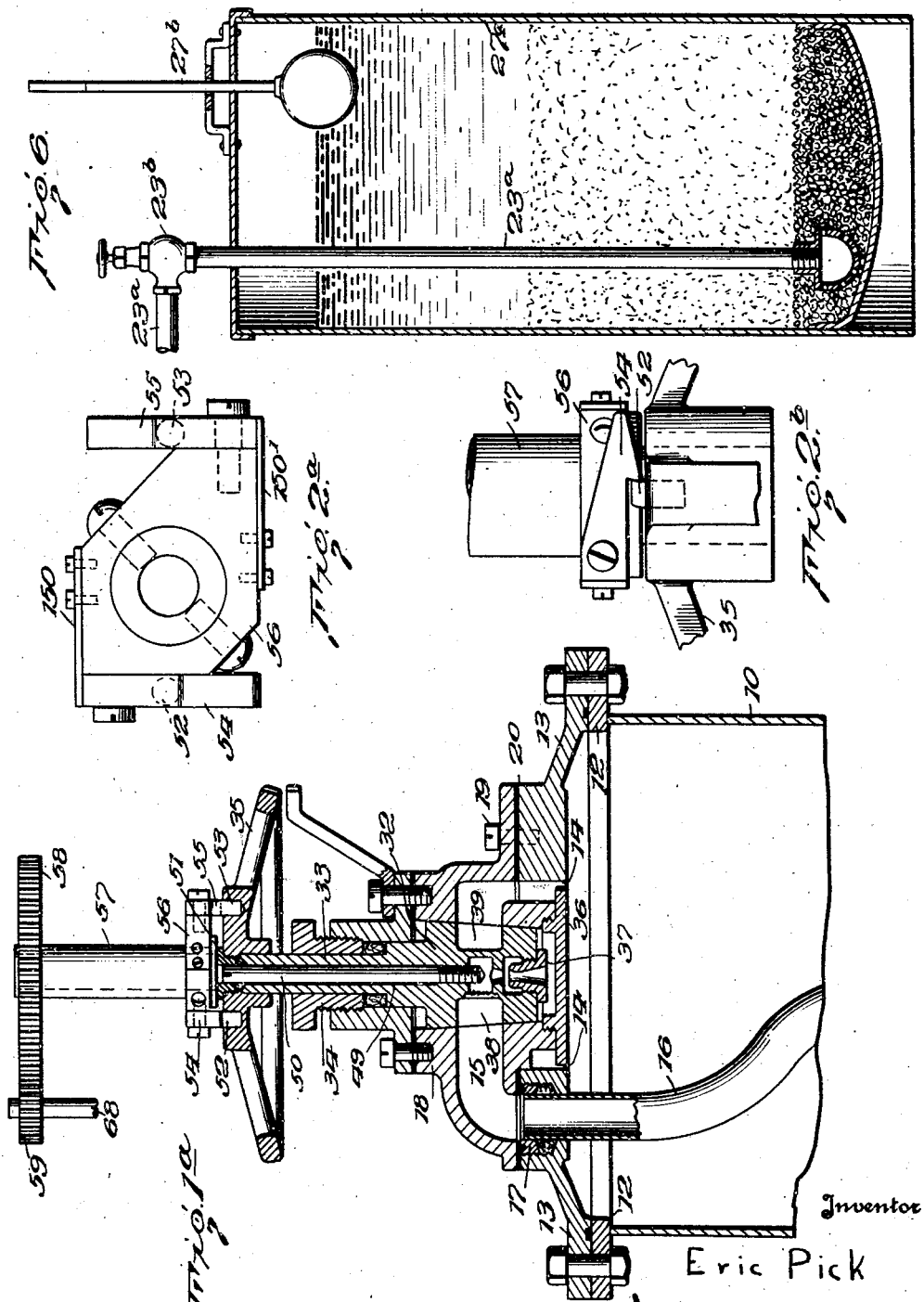
Inventor
Eric Pick
By K. P. McElroy
Attorney

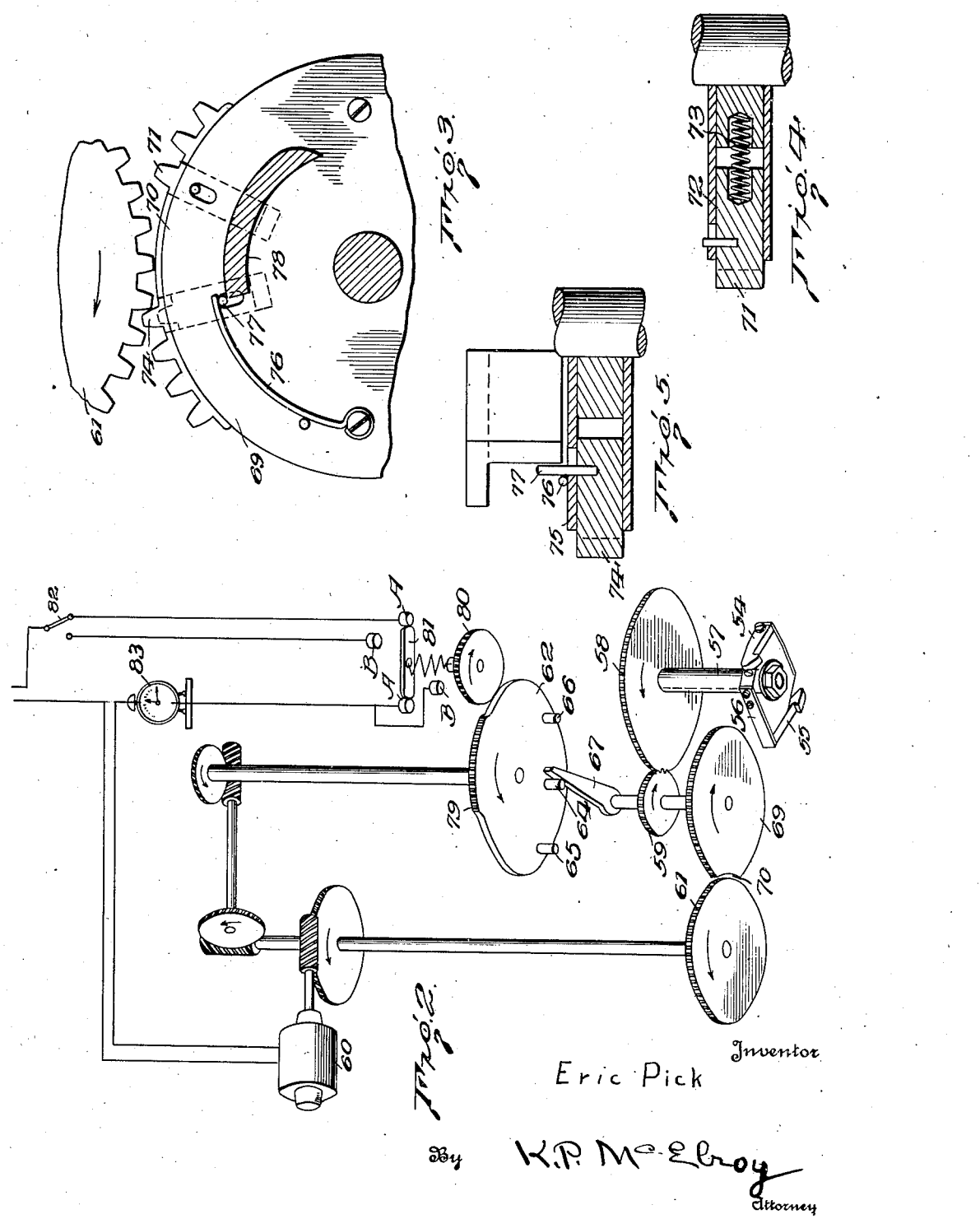

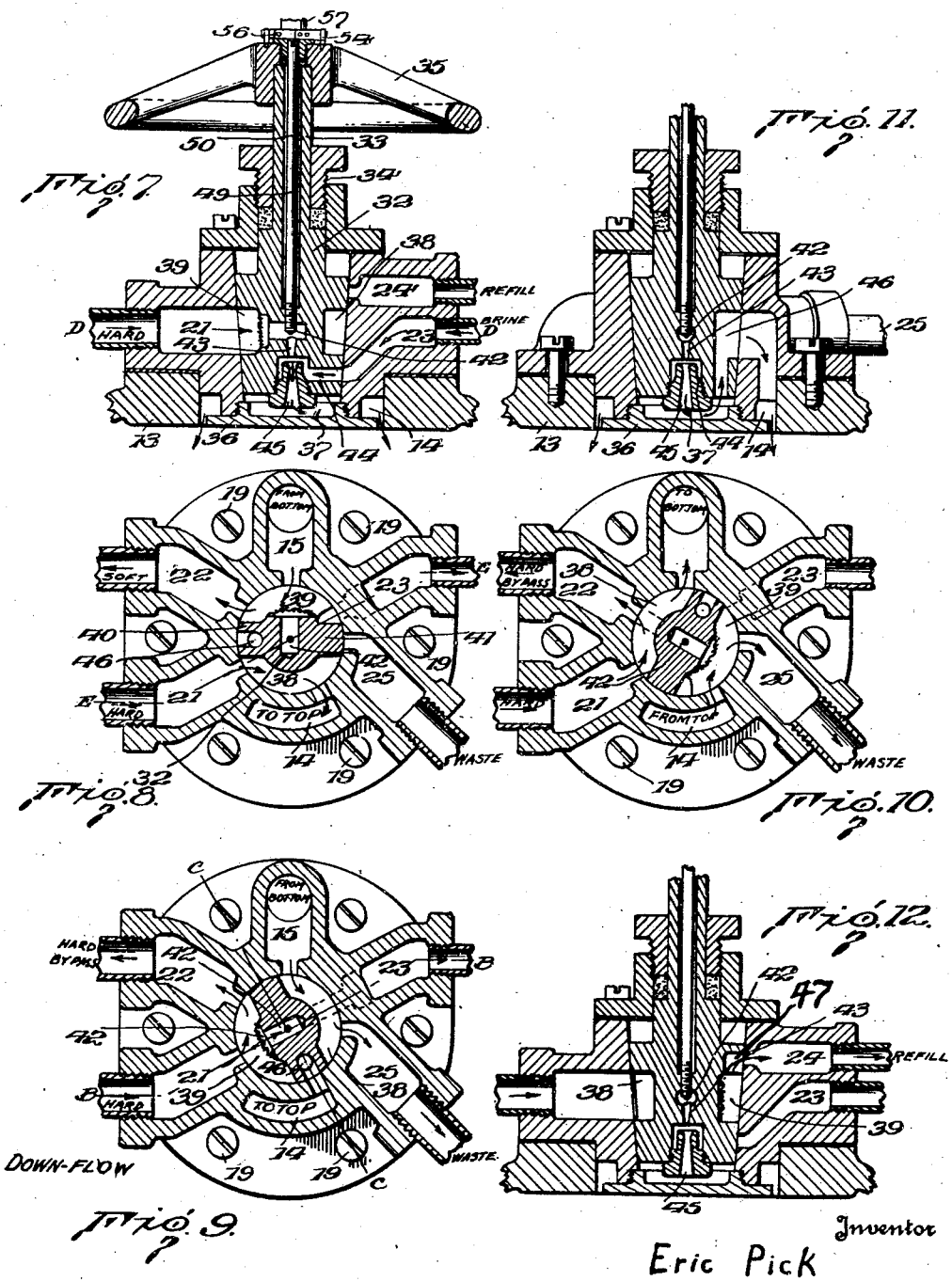

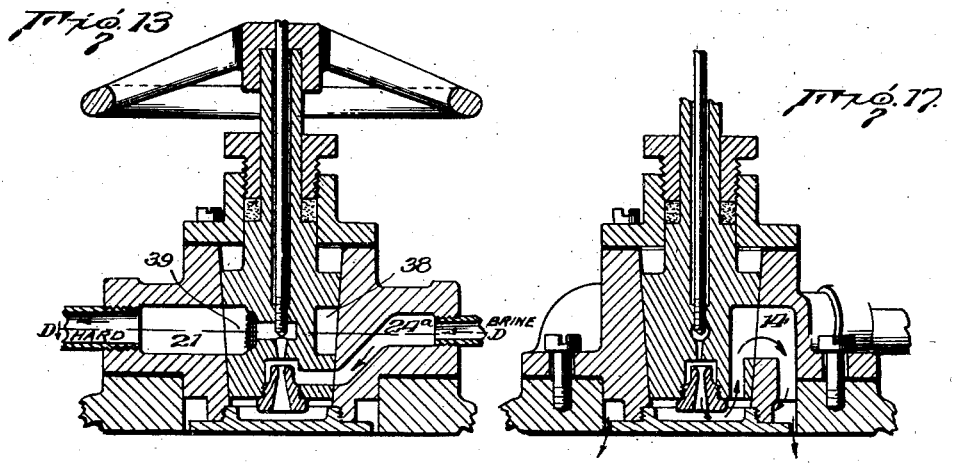
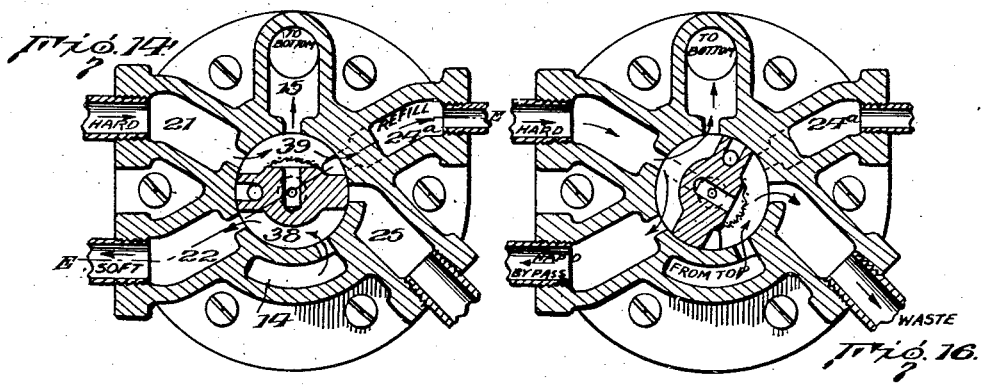
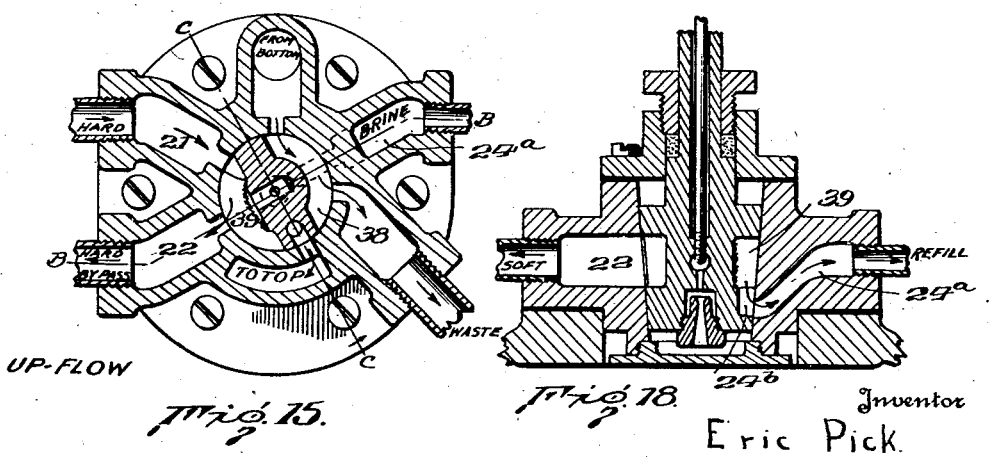

Nov. 28, 1933.  E. PICK  1,937,324
WATER TREATING APPARATUS
Filed Sept. 24, 1930   6 Sheets-Sheet 6
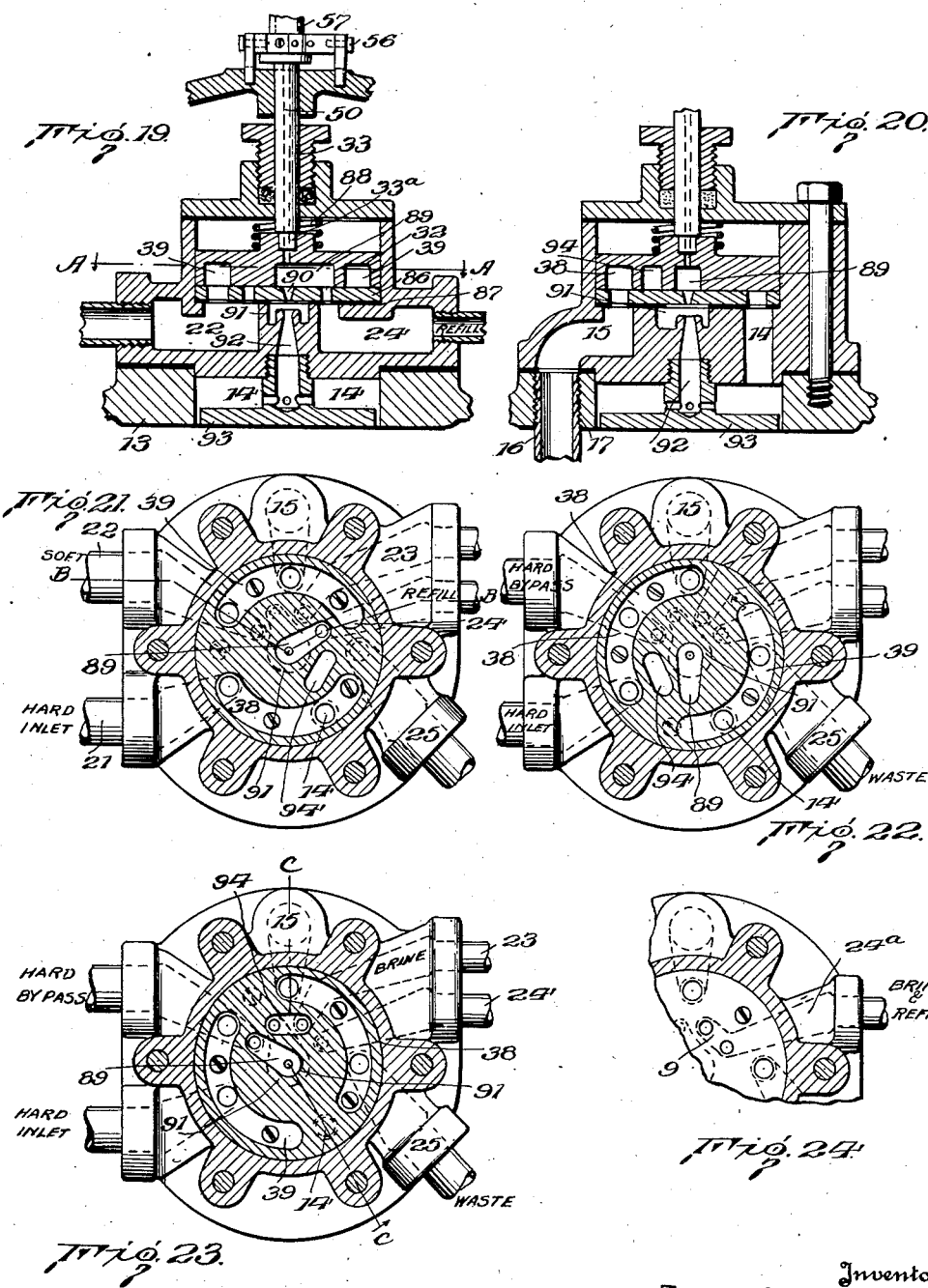
Inventor
Eric Pick
By K. P. McElroy
Attorney Patented Nov. 28, 1933

1,937,324

UNITED STATES PATENT OFFICE 1,937,324

WATER TREATING APPARATUS

Eric Pick, New York, N. Y., assignor to The Permutit Company, New York, N. Y., a corporation of Delaware Application September 24, 1930
Serial No. 484,164

24 Claims. (Cl. 210—24)

This invention relates to water treating apparatus; and it comprises more specifically a water softening apparatus which includes a zeolite chamber closed by a top head with an attached multiway valve having a plurality of ports in its casing, of which one port communicates through a pipe with the bottom of the zeolite chamber, another port communicates directly with the top of the chamber and others are adapted to be connected respectively to hard water supply line, soft water service line, brine supply line and waste pipe, a special rotatable member disposed in the casing and having channels adapted to connect the ports in pairs or threes and thereby to place the apparatus successively in softening, washing and regenerating positions in rotating the member through three equal circular arcs and geared rotating means adapted to automatically rotate said member through three equal angles in succession at predetermined intervals of time; all as more fully hereinafter set forth and as claimed.

In water softening by aid of a stationary bed of zeolites or base-exchange silicates, it is necessary to interrupt the softening operation from time to time in order to regenerate the zeolites by aid of brine and to rinse out the brine. It is also necessary occasionally to wash or backwash the bed to remove accumulated impurities. Thus zeolite water softening usually involves the three separate operations of softening, regenerating, including rinsing, backwashing.

Notwithstanding many different forms and arrangements of apparatus elements that have been proposed, it is still a matter of importance to simplify the mechanics of water softening, to improve its economy in both plant investment and operation and to make it convenient and fool-proof. In particular, it is desirable to have a household water softener that is simpler to operate than those of the prior art.

In the present invention, simplification of water softening apparatus is one of the main objects achieved. The container for the zeolite bed is of simplified construction, production and delivery of brine thereto are simplified and there is provided a simplified multiway valve which makes possible a simple and convenient operation of the softener in the three phases of either upflow or down-flow softening, regenerating including rinsing and washing. The operation of the softener is simple, consisting in mechanically turning the multiway valve, which may be done by hand or be done automatically by means of a motor controlled by a watermeter, or by a clock. The operative attention required may be reduced to the pushing of a switch button when regeneration is in order. Manual operation is possible and convenient.

Describing the invention in detail, a container tank forming a zeolite chamber has closed sides and bottom and a flanged top which is closed by a dished flanged head having two openings therein, one of which is large enough to serve as a zeolite filling hole and is in direct communication with the top of the zeolite chamber, the other opening communicating through an internal pipe with the bottom of the chamber. These two openings form the inlet and outlet of the chamber and provide the only passages to the inside of the chamber during operation.

To the flange head of the zeolite container is attached a valve specially adapted to fit the flange head. This valve has a plurality of ports in its casing, two of which connect directly with the flange head openings, and thus with top and bottom respectively of the zeolite chamber. Other ports in the valve casing are adapted to be connected respectively with the hard water supply line, the soft water service line, one or two brine tank lines and the waste line. The casing ports all lead to a central valve chamber with a tightly fitting rotatable plug therein. The respective ports are so positioned and the plug is so shaped as to connect two different pairs of ports at a time, one pair including the port connected with the top of the zeolite chamber, and the other pair including the bottom connected casing port. The port positions and plug construction are such that by rotating the plug through three equal arcs of a complete circle, that is, by successive rotations of 120 degrees each, connections are made for regeneration, washing and softening, or vice versa. For both regeneration and washing the arrangement of ports and plugs is such as to effect a bypass of hard water to the soft water line. The arrangement of ports may be adapted alternatively either to down-flow or to up-flow of water to be softened through the zeolite bed. Down-flow regeneration and rinsing are usually provided, and up-flow backwashing.

In providing for the softening, regenerating and washing positions of the softener corresponding with three respective angular positions of the value plug 120 degrees apart, the hard and soft water ports are placed in one end of the valve casing, the brine and waste ports in the opposite end and the top and bottom chamber ports in opposite sides. The plug is formed with two channels running circumferentially through arcs on opposite sides of the plug, leaving sections of solid plug between the two channels at the ends thereof. When the plug is in what may be called the zero or softening position one channel is connected to the hard water port and the other channel to the soft water port, an end piece of the plug between the two channels is between these two ports, and one of these two arcal channels may serve to connect the hard water line to either the side port running to the top of the chamber, or to the other side port connected to the bottom of the chamber while the other channel connects the soft water service line to the bottom or top respectively. These are two alternative arrangements for either down-flow or up-flow softening according to the port connections with hard water and soft water lines respectively as will be more particularly shown by the drawings.

Rotation of the valve plug through 120 degrees from the zero position in either direction places the valve respectively in backwashing and regenerating positions. In these positions either one or the other of the channels connects the hard and soft water ports and permits bypassing of hard water to service. Rotation through 120 degrees in one direction directs the water supply through one channel to the bottom port and connects the top port through the other channel to the waste line, thus providing for an upward backwashing of the zeolite bed. The same degree of rotation from the zero position in the opposite direction, or a further rotation of the plug through 120 degrees from the washing position, places the valve in regenerating position, cuts off the supply of hard water from the bottom connection and connects the bottom port through one channel to the waste while placing the other channel out of direct connection with either top or bottom port and continuing the hard water bypass connection through this other channel.

Regeneration and rinsing are effected by means of an injector inlet passage running from the last-named channel through the central portion of the plug with a connected injector nozzle disposed in the bottom portion of the plug delivering into a brine injector inlet in the plug positioned between the injector and the periphery of the plug at a different level from that of the other ports, this position being such that the described rotation of the plug brings the brine injector inlet into connection with the brine port. The injector discharges through an axial passage near the bottom of the plug into a circular space in the bottom of the valve casing which communicates with the top of the zeolite chamber. The injector nozzle is accessible through a tubular passage in the plug stem, through which passage the nozzle can be cleared of obstructions deposited by the water. Or the nozzle flow can be adjusted by means of a valve rod inserted through the tubular passage into the inlet passage to the injector.

In the described valve structure a number of modifications are possible. For example, instead of a single brine port, there may be two ports in this portion of the casing; one being a brine inlet connection as described and the other being adapted to serve as a refill connection for water supply to a brine tank. For further example, the brine inlet, refill connections and injector may be dispensed with to make the valve particularly adapted for use with a water filter or for other water treatment purposes.

The valve construction can be modified without departing from the principle of adapting the ports and plug to obtain a plurality of valve positions such as softening, washing and regenerating by turning the plug through a plurality of equal angles of rotation. Instead of having the plug extend through the casing to connect the casing ports through peripheral plug channels, the plug may be built as a "rotating slide valve" extending only a short way vertically through the casing. In this modification the ports are located around a circle in the bottom part of the casing and the port connections are made in pairs or threes through channels formed in the bottom part of the plug, communications between the ports and the channels in the various positions being made through a port plate located below the plug and having holes communicating with the various ports. The injector nozzle may then be formed in the plate directly under the vertical axis of the plug with the injector brine inlet and discharge passage formed in the body of the valve, two special channels being formed in the plug to connect the injector at proper times with the water supply, with the refill port and with the brine port. Access to the injector is again obtained through a tubular passage in the valve plug stem.

Turning of the valve through three equal angles is by simple mechanical means which may include an automatic valve control particularly adapted both to providing power for turning the valve and to timing the intervals between the turnings in order to provide necessary and proper time for regenerating and backwashing with return to softening.

The control mechanism comprises an electric motor with two trains of reducing gears connecting the motor shaft with the valve wheel through a collar, pawl and pin attachment. One train of gears connects with the valve wheel through a pair of driving gears in a 1:3 ratio so that one revolution of the smaller gear produces one third of a complete revolution of the valve plug, or a rotation of 120 degrees. The other train of gears operates through a timing cam, 3 pins and a lever to bring a cutout gear in the first train into mesh and thus to start the valve turning at intervals of time determined by the positions of the three pins on the timing cam. This cam has a toothed section adapted to mesh with a gear operating to open a suitable switch in the motor circuit and stop the motor when the valve is at zero or softening position. Various devices can be used to close the motor circuit and start regeneration. One simple and convenient starting device is a manual switch in series with the stopping switch. In series with the two switches may be an alarm clock switch adapted to complete the closing of the motor circuit and start regeneration at an opportune time after the manual switch has been closed. The manual switch may be replaced by a switch operated by a watermeter after a predetermined quantity of water has been softened, or it may be operated by a clock mechanism at predetermined time intervals.

In the accompanying illustrations is shown, more or less diagrammatically, certain apparatus within the purview of the present invention and capable of operation in the described manner. In this showing, Fig. 1 is a view in vertical section, partly in elevation, of a water softening apparatus including a multiway valve and a brine tank adapted to automatic control;

Fig. 2 is a diagrammatic view in elevation of the valve operating mechanism as attached to the multiway valve of Figs. 1 and 1a;

Fig. 2a is a top plan detail of the valve operating mechanism attachment;

Fig. 2b is a side elevation of the attachment of Fig. 2a;

Fig. 3 is a detail in section of the cutout gear of Fig. 2;

Fig. 4 is a detail of the engaging tooth of the cutout gear of Fig. 3;

Fig. 5 is a detail of the disengaging tooth of the cutout gear of Fig. 3;

Fig. 6 is a view in vertical section of a manually operated brine tank having a single connection to the multiway valve;

Fig. 7 is a view in vertical section of the multi-way valve for down-flow softening taken along line B—B of Fig. 9;

Fig. 8 is a horizontal section taken along line D—D of Fig. 7 and shows the valve in softening position;

Fig. 9 is a horizontal section taken along line D—D of Fig. 7 and shows the valve in down-flow regenerating position;

Fig. 10 is a horizontal section taken along line D—D of Fig. 7 and shows the valve in up-flow back-washing position;

Fig. 11 is a vertical section in the plane of the line C—C of Fig. 9;

Fig. 12 is a vertical section along the line E—E of Fig. 8.

Fig. 13 is a vertical section taken along line B—B of Fig. 15 and shows a modified multiway valve adapted to up-flow softening. This figure illustrates a valve having a single combined brine and refill connection for manual operation.

Fig. 14 is a horizontal section taken along line D—D of Fig. 13 and shows the valve in softening position;

Fig. 15 is a horizontal section taken along line D—D of Fig. 13 and shows the valve in down-flow regenerating position;

Fig. 16 is a horizontal section taken along line D—D of Fig. 13 and shows the valve in up-flow washing position;

Fig. 17 is a vertical section in the plane of the line C—C of Fig. 15;

Fig. 18 is a vertical section on the line E—E of Fig. 14;

Figure 1:
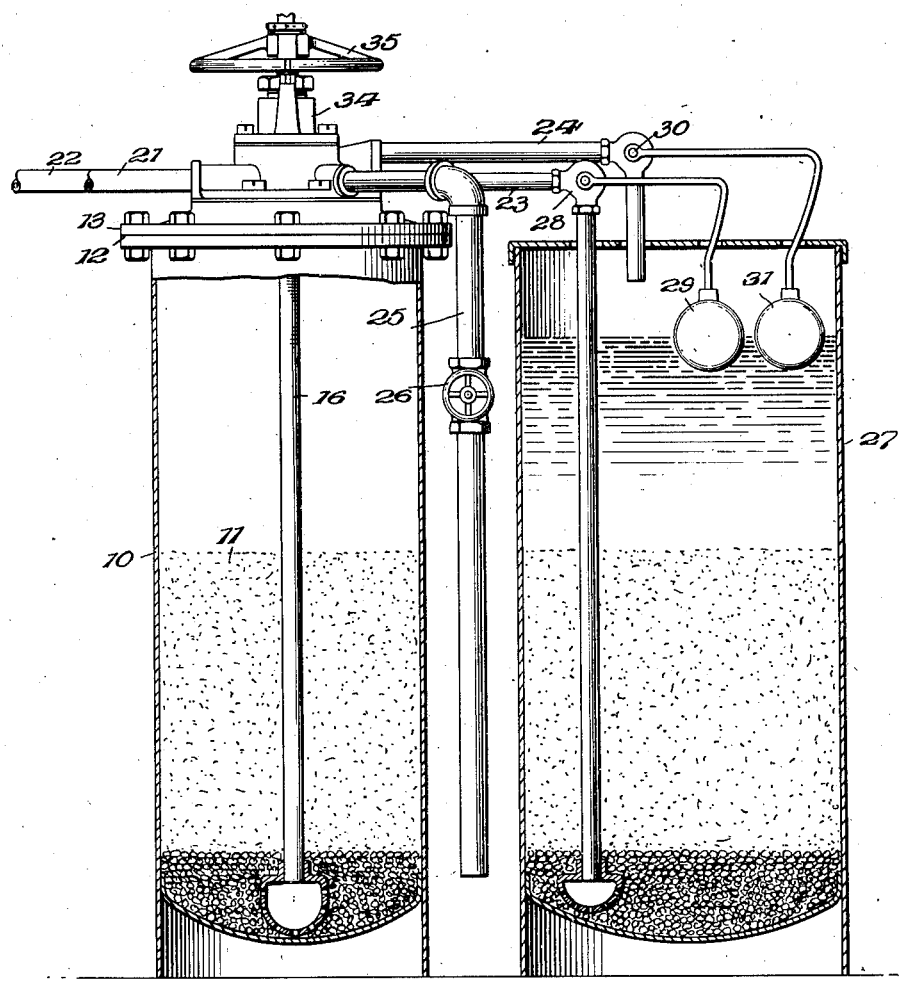
Fig. 1a is a vertical section of the top of the softener of Fig. 1 showing the multi-way valve attachment, the view being at right angles to that of Fig. 1.

Figs. 19 to 24 illustrate a multiway valve of modified construction; Fig. 19 is a vertical section in the plane of the line B—B of Fig. 21; Fig. 20 is a vertical section in the plane of the line C—C of Fig. 23;

Figs. 21, 22, 23 are horizontal sections in the plane of the line A—A of Fig. 19, the valve being in softening, backwashing and regenerating positions, respectively, and Fig. 24 is a detail in horizontal section of a valve modification providing a single combined brine and refill port.

It is to be noted that Figs. 7 to 12 illustrate a valve adapted to down-flow softening and Figs. 13 to 18 illustrate a similar valve adapted to up-flow softening.

Figs. 7 to 12 illustrate a valve having separate ports for brine and for refill while Figs. 13 to 18 illustrate a modified valve having a single combined brine and refill port.

Referring to the drawings, and particularly to Figs. 1 and 1a, the water softening chamber 10 containing a zeolite bed 11 has, as shown, a top comprising a flange 12, and a counter-flange 13. The counter-flange 13, which is dished upwardly as shown, is formed with a neck port having two openings shown at 14 and 15. Opening 14 is in direct communication with the top portion of the softening chamber and is large enough to permit placing a charge of zeolite in the softening chamber. Opening 15 is adapted to receive pipe 16 extending to the bottom of the softener, the connection being advantageously made by means of stuffing gland 17. In assembling the apparatus or for replacement purposes, pipe 16 may be passed through opening 14 to be connected in opening 15 of the top member 13. To the counter-flange 13 is attached multiway valve 18 by means of screws 19, the joint being made with gasket 20. In the casing of the valve are ports connected as follows: to the top of the zeolite chamber 14, to bottom of the zeolite chamber 15, to hard water supply 21, to soft water service 22, to brine line 23, to brine tank refill pipe 24 and to waste line 25, the waste line having valve 26. As shown, the brine line 23 runs from the bottom of brine tank 27 and refill pipe 24 runs to the top of the brine tank. Brine line 23 is provided with float valve 28 having float 29 adapted to close the brine line when the liquid level in tank 27 drops to a predetermined extent. Refill pipe 24 has a float control valve 30 with float 31 adapted to close the refill pipe when the liquid level in the tank rises to a predetermined extent. The multiway valve 18 has a central specially shaped plug 32 with plug stem 33, packing gland 34 and wheel 35. In the bottom of the valve casing is screwed nut 36 having a depression or open space forming a passage 37.

Valve plug 32 is formed with two peripheral channels 38 and 39 on opposite sides of the plug, the channels being separated at the ends by solid portions 40 and 41 of the plug. Each of these channels is adapted to form connections between different combinations of casing ports in succession as the plug is rotated through angles of 120 degrees.

In the zero or softening position, (Fig. 8) channel 38 connects hard water port 21 and top port 14 while channel 39 connects bottom port 15 with soft water port 22. In this softening position hard water enters the zeolite chamber through the top port opening 14, passes through the zeolite bed, and softened water runs out of the chamber from the bottom through pipe 16, port 15, channel 39, and soft water port 22.

To change the valve and the softener to back-washing position, valve plug 32 is rotated clockwise through an angle of 120 degrees (Fig. 10). This brings channel 38 into a position connecting the hard water, soft water and bottom ports, at the same time putting channel 39 into communication with the top port and the waste port. In this position hard water is bypassed to service through port 22 and also enters the zeolite chamber at the bottom through pipe 16, flows upwardly through the zeolite bed, out of the chamber through 14 and passes by way of channel 39 to the waste port.

A turn of the valve plug clockwise through an angle of 120 degrees from the backwashing position places the valve and the softener in regenerating position. This position is of course the same as that resulting from a turn of the valve plug through an angle of 120 degrees counter-clockwise from the zero or softening position. This turn (Figs. 7, 9 and 11) places channel 39 in communication with the hard water and the soft water ports affording bypass of hard water to service and puts channel 38 in communication with the bottom port and the waste port. In plug 32 an injector inlet 42 is formed to run horizontally from channel 39 into the plug to injector nozzle 43. Formed in the plug and disposed parallel to injector inlet 42 and at a lower level is communicating brine injector passage 44 which is formed in the plug 32 in a position adapted to communicate with the brine port 23 when the plug is in the regenerating position. Brine injector passage 44 communicates with a flared axial passage in the plug near its bottom forming injector discharge 45. The injector discharge communicates with space 37 and a passage 46 is formed in the plug in a position at right angles to brine inlet 44. Passage 46 terminates in solid portion 40 of the plug and when the plug is in the regenerating position, passage 46 affords communication between space 37 and top port 14 (Fig. 11). In this position of the valve hard water flows by channel 39, inlet 42, through injector 43 sucking brine through port 23 and passage 44 and discharging diluted brine through axial passage 45, space 37, passage 46 and port 14 into the top of the zeolite chamber; the spent brine running to waste from the bottom of the chamber through pipe 16, port 15, channel 38 and waste port 25. When the brine is shut off by float valve 28, water alone continues to flow through the zeolite bed, the residual brine being thus rinsed out.

A turn of the valve plug clockwise through an angle of 120 degrees from the regenerating position returns the valve to the softening or zero position. In this position (Fig. 12) water flows from channel 39, through a notch 47 formed in the plug for the purpose, to refill port 24 and thence into the brine tank 27. The amount of brine and water respectively flowing to the zeolite chamber in the regenerating position and through the valve to the brine tank in the softening position are automatically controlled by float valves 28 and 30 in the brine and refill lines respectively.

The valve is readily adapted to softening by an upward flow through the zeolite bed. All that is necessary is to reverse the hard and soft water connections as shown in Figs. 13 to 18, particularly in Figs. 14, 15 and 16.

Valve 18 is operated by means of valve plug stem 33 which is attached to valve plug 32 and extends through packing gland 34. The valve stem 33, as shown, is hollow, having a tubular passage 49. Through this passage may be inserted an adjusting rod 50 with a screw head passing through stuffing gland 51. This valve rod may serve to regulate the opening from injector inlet 42 into the injector nozzle 43. Valve rod 50 can be dispensed with and tubular passage 49 can then be used to afford access to the injector by means of a wire or the like for the purpose of clearing out obstructions. The wheel 35 on the stem 33 is connected to a valve operating mechanism such as that shown diagrammatically in Fig. 2. The connection is by means of pins 52 and 53 in the wheel head engaged by pawls 54 and 55 pivoted to collar 56 keyed to a hollow shaft 57 which is geared to shaft 68 in a 3:1 ratio by gears 58 and 59 and rotatable by a train of gears running to a motor. The shaft 57 is made hollow in order to afford access to valve rod 50 by means of a screw driver or the like. Operation of the valve is by means of the energy of constant speed electric motor 60. The shaft of the motor is connected through two trains of gears to driving pinion 59 which engages with gear 58. The gear train terminating in gear 61 is for turning purposes and the gear train terminating in cam 62 is for timing and starting purposes. Cam 62 has three pins 64, 65 and 66. Adapted to engage with these pins is lever 67 attached to the shaft 68 on which driving pinion 59 and a cutout gear 69 are keyed. The pins on the cam 62 are so located as to engage the lever 67 at predetermined intervals of time. Cutout gear 69 engages with gear 61 of the driving train. Cutout portion 70 of the gear 69 automatically stops the turning of gear 69 after each rotation thereof. And the rotation of gear 69 and of driving pinion 59 is started by an engagement of lever 67 with one of the cam pins 64, 65 or 66, the pins being respectively associated with turning the valve to washing, regenerating and softening positions. This cam-pin-lever arrangement serves not only to time the turning of the valve but also to provide additional power to overcome starting inertia and to start the turning of the valve at a relatively slow rate which is increased when cutout gear 69 becomes enmeshed with gear 61. Advantageously, the cutout gear 69 has its engaging tooth and its disengaging tooth radially slidable. Engaging tooth 71 may slide in a radial direction in the groove 72 and be pressed outward by coil spring 73 (Fig. 4). By this arrangement, if the engaging tooth meets head on with a tooth of the gear 61, the engaging tooth may slip towards the center and then as soon as this tooth on gear 61 has passed, tooth 71 can slip out again and mesh properly with the following tooth of the driving gear. The disengaging tooth 74 is slidable in groove 75 and is pressed toward the center by spring 76. This slidable disengaging tooth carries a pin 77 (Fig. 5) which runs over a cam 78 attached to the gear casing. Upon reaching the end of the cam the pin slips off due to the action of the spring and the tooth is brought positively out of mesh.

For automatically shutting off the power from the motor at the end of a washing and regenerating and rinsing cycle, a gear segment 79 is provided in cam 62. This segment is positioned to engage at the proper time with gear 80 which operates a switch 81, throwing it from the connections A, A, as shown in Fig. 2 to connections B, B. As shown in the figure a starting switch 82 is provided to switch the current through either the A or the B connections of the stopping switch 81. In series with both the starting switch and the stopping switch is alarm clock switch 83 adapted to close the circuit at a set time.

In operation, when regeneration is in order as shown by the usual tests, the alarm clock can be set for a convenient time and starting switch 82 is closed. When the alarm clock switch is closed the motor is started and when pin 64 engages lever 67 the turning of cutout gear 69 and of gear 58 and that of the valve plug is started at a relatively low speed. As soon as cutout gear 69 is thrown into mesh with gear 61 on the driving train, the turning of the valve plug is continued at a relatively higher speed. One complete revolution of cutout gear 69 and of driving pinion 59 turns gear 58 and the valve plug through one-third of a revolution or 120 degrees from softening to washing position, the turning of the valve being stopped when cutout 70 is reached. The valve remains in this position for a time determined by the relative position of pin 65 on the cam 62 and when this pin engages the lever 67 the cutout gear 69 is thrown into mesh again, makes one revolution and is stopped when the cutout portion comes around to its original position in relation to gear 61. The valve is thus turned to regenerating and rinsing position and remains in this position until pin 66 engages lever 67 and turns the valve back of softening position. At this time gear segment 79 on the cam meshes with gear 80, throws switch 81 open and stops the motor. It is a comparatively simple matter to compose the cam 62 and the pin positions so that washing and regeneration will continue for proper lengths of time.

The operating mechanism of Fig. 2 while particularly adapted for the operation of water softeners and extremely useful in this relation may be used for other purposes. For example, with lever 67 operated manually, the cut-out gear 69 could be made to operate an eccentric press. With cam 62 operated by a meter or other periodically operating device the timer could be used in varied relations, as in lime feeding devices for soda lime softeners. Whenever a predetermined quantity of water passes through a meter the engaging lever 67 can be operated, whereupon gear 69 causes a certain and predetermined amount of lime to be added to the water, as by emptying a bucket. With cam 62 operated by a source of power such as motor 60 but without the use of switch 81 the device will repeat its cycles indefinitely. In this relation it could be used for producing periodic changes in advertisement displays, in the control of water gas producers, etc., etc.

The softener is, as shown, adapted to be manually operated. The valve can be turned by hand, whereby the pawls 54 and 55 are disengaged from the pins in the valve wheel. Upon completion of one revolution of the wheel the pawls, by the action of the springs 150 and 150¹, again snap over the pins so that the valve is ready to be turned by the motor driven operating mechanism. The two pawls 54 and 55 and the two pins 52 and 53 are spaced at unequal distances from the center line, so that they cannot come into engagement in an incorrect relation. Even if the handwheel is manually turned to some interport position and left there, a starting of the motor will automatically cause the pawls 54 and 55 to engage with the pins 52 and 53 in the correct relation, and when the operating mechanism has completed its cycle the valve will have been turned to the softening position, as is desired. In manual operation brine tank 27 with its float valves 28 and 30 is adapted for automatic brine control. For exclusively manual operation with manual brine control the arrangement can be such as that illustrated in Fig. 6. The brine tank may have a single connection to the multiway valve, designated as 23a with a manually operated valve 23b. For such brine operation a modified multiway valve may be used. This modified valve has a single combined brine and refill port. This combined brine and refill port, designated 24a, is illustrated in connection with the valve adapted to up-flow softening shown in Figs. 13 to 18. In regenerating, this single port 24a works similarly to port 23 as above described. In order to use this brine port for purposes of refilling the brine tank, the valve plug 32 has a notch 24b communicating with channel 39 and so positioned in the plug that when the valve is in softening position connection is made through this notch 24b from channel 39 to port 24a (Fig. 18) To regenerate, valve 23b is opened when valve plug 32 is in regenerating position and brine is sucked from the brine tank 27a by the injector. When sufficient brine has been introduced to the zeolite, valve 23b is closed and rinsing proceeds. Brine tank 27a is refilled by opening valve 23b when valve plug 32 is in the softening position and allowing the brine tank to be refilled with water. The level of the liquid in the brine tank is indicated by the float indicator 27b at the top.

As stated ante, the multiway valve is susceptible to modification in construction. A modified construction which may be named a rotary slide valve is shown in Figs. 19 to 24. In the rotary slide valve the ports are located in a circle around the body of the valve in the bottom portion, there being, as shown, hard water port 21, soft water port 22, top port 14, bottom port 15, brine port 23, refill port 24, waste port 25. These ports all have openings into the bottom of the chamber containing the valve plug 32. Port plate 86 is placed between the plug and the port openings, the port plate having holes therein communicating with the port openings. The port plate is held to the body of the valve by means of screws, with a gasket 87. Plug 32 is held against the port plate by spring 88, and is rotatable by hollow stem 33 which fits into a square notch 33a in the plug. The plug 32 is formed with arcal channels 38 and 39 in the bottom of the plug extending around the plug on opposite sides and communicating with the different port openings in plate 86 as the valve plug is turned to different positions. The bottom of the plug also has a short channel 89 extending from the axis at an angle such that the channel communicates with the refill port opening when the valve plug is in softening position and with one of the soft water port plate openings when in regenerating position. An injector inlet nozzle 90 is formed in the port plate 86 directly under the plug, co-axial therewith and communicating at all times with channel 89. Injector nozzle 90 delivers axially downward into injector brine inlet 91 formed in the body of the valve and communicating with injector discharge nozzle 92 running through fitting 93 and discharging into the top of the zeolite chamber. Another short channel 94 is formed in the plug bottom close to channel 89 and positioned to connect the plate opening of brine port 23 with the plate opening of brine inlet 91 (Fig. 23).

Operation of the modified valve of Figs. 19 to 23 is substantially the same as that of the valve of Figs. 7 to 12, the valve being turned through 120 degree angles successively by shaft 57 which is driven by motor 60. In the regenerating position (Fig. 23) water flows with bypass to service, via channel 39, the soft water port openings and channel 89 to injector nozzle 90. The flow through the injector draws brine through inlet 91, channel 94 and brine port 23 and the discharge is through nozzle 92 into the top of the zeolite chamber. First spent brine and then rinse water run to waste from the bottom of the chamber through pipe 16, bottom port 15, channel 38 and waste port 25. In the zero or softening position, (Fig. 21) the course of the water is by port 21 through its plate opening into and through channel 38, thence by port 14 into the top of the zeolite chamber. Traversing the zeolite bed, softened water flows from the bottom of the chamber by pipe 16, port 15 and its plate opening, through channel 39 into the soft water port 22, and thus to service. During the softening phase the brine tank is refilled, the refill water flowing from the top of the softening chamber, clearing out the injector, and going by channel 89 and refill port 24 to the top of the brine tank 27. Backwashing (Fig. 22) is via channel 38 (with bypass to service), bottom port 15, to the bottom of the zeolite chamber, upwardly through the zeolite bed and out of the chamber via port 14, then through channel 39 and port 25 to waste.

A modification of the rotary slide valve involving a single, combined brine and refill port 24a (Fig. 24) connected to a manually operated brine tank (Fig. 6) may comprise an extension 9 of port 24a adapted to connect the port with channel 94 through a port plate opening.

The rotary multiway valve is particularly adapted for use in operating a zeolite water softening system, but it may be used with slight modifications in liquid treating processes generally. Operation of a water treating apparatus equipped with this rotary valve directly attached to a treating tank, as above described, is simple, convenient and fool-proof.

In the drawings the valve arrangement is shown mounted atop the cylinder and this is regarded as the best form since it enables the use of simple cylindrical unperforated tanks. The valve arrangement can, however, be equally well applied to the side of a tank, this being perforated and threaded for that purpose. In this arrangement, however, special construction is necessary to take the leverage of the parts. And because of the projecting lateral parts shipment is not quite so simple. But the operation of the various valves and gearing trains is the same whether entrance to the softener is from the side or from the top, or from top and bottom. In up-flow softening the washing operation is sometimes omitted when softening is carried out with a rate of flow equal to that required for washing. In that event the design of the multiway valve is modified so that the two positions viz, softening and regenerating including rinsing are 180 degrees apart. In this case, for automatic operation, the gears 58 and 59 have a 2:1 ratio and the pin controlling the starting of the washing operation is omitted from cam 62.

What I claim is:

1. In base exchange water softening apparatus, a closed zeolite container having a cover member with two openings formed therein to provide the inlet and the outlet of the container, one of said openings being of relatively large size and communicating directly with the inside of the container at the top, the other opening of relatively small size communicating separately and independently of said first named opening with the inside of the container near the bottom, the communication being through an internal pipe connected with said smaller cover member opening, and a single removable closure member comprised in a casing of a multiway valve directly attached to the cover member and having two ports directly communicating respectively with the two openings of the cover member, said valve having also a plurality of other ports in its casing and a rotatable member, said ports and rotatable member being adapted to provide communication through the cover member openings between the inside of the container and hard water, soft water, brine and waste lines.

2. In water-softening apparatus, a closed zeolite container having a top head having two openings therein forming inlet and outlet for the container, one of said openings communicating directly with the inside of the container at the top, the other opening communicating through an internal pipe with the inside of the container near the bottom, the top head being attached to a multiway valve having two ports in its casing communicating respectively with the two openings of the top head, said valve having also a plurality of other ports in its casing and a rotatable member, said ports and rotatable member being adapted to connect the inside of the container through the top head openings to hard water, soft water, brine and waste lines, said rotatable member and casing ports being adapted to place the apparatus in different and successive operating positions by rotating the member through equal circular arcs.

3. In water-softening apparatus, a closed zeolite container having a top head having two openings therein forming inlet and outlet for the container, one of said openings communicating directly with the inside of the container at the top, the other opening communicating through an internal pipe with the inside of the container near the bottom, the top head being attached to a multiway valve having two ports in its casing communicating respectively with the two openings of the top head, said valve having also a plurality of other ports in its casing and a rotatable member, said ports and member being adapted to connect the inside of the container through the top head openings to hard water, soft water, brine and waste lines, said rotatable member and casing ports being adapted to place the apparatus in regenerating, backwashing and softening positions, in rotating the member through three equal circular arcs.

4. In water-softening apparatus, a closed zeolite container having a top head having two openings therein forming inlet and outlet for the container, one of said openings communicating directly with the inside of the container at the top, the other opening communicating through an internal pipe with the inside of the container near the bottom, the top head being attached to a multiway valve having two ports in its casing communicating respectively with the two openings of the top head, said valve having also a plurality of other ports in its casing and a rotatable member, said ports and member being adapted to connect the inside of the container through the top head openings to hard water, soft water, brine and waste lines, said rotatable member and casing ports being adapted to place the apparatus in different and successive operating positions in rotating the member through equal circular angles, said member having a stem and geared rotating means adapted to rotate said stem and member through equal circular angles in succession.

5. In water-softening apparatus, a closed zeolite container having a top head having two openings therein forming inlet and outlet for the container, one of said openings communicating directly with the inside of the container at the top, the other opening communicating through an internal pipe with the inside of the container near the bottom, the top head being attached to a multiway valve having two ports in its casing communicating respectively with the two openings of the top head, said valve having also a plurality of other ports in its casing and a rotatable member, said ports and member being adapted to connect the inside of the container through the top head openings to hard water, soft water, brine and waste lines and thereby to place the apparatus successively in different operating positions in rotating the member through three equal angles, said member having a driving gear connection including two gears meshed in a 1:3 ratio adapted to rotate the plug through three successive angles of 120 degrees.

6. In water-softening apparatus, a closed zeolite container having a top head having two openings therein forming inlet and outlet for the container, one of said openings communicating directly with the inside of the container at the top, the other opening communicating through an internal pipe with the inside of the container near the bottom, the top head being attached to a multiway valve having two ports in its casing engaging respectively with the two openings of the top head, said valve having also a plurality of other ports in its casing and a rotatable plug, said ports and plug being adapted to connect the inside of the container through the top head openings to hard water, soft water, brine and waste lines and thereby to place the apparatus in different and successive operating positions in rotating the plug through equal circular angles, said plug having a stem with a geared connection to a constant speed motor and being also connected to the motor through a lever and cam adapted to start rotation of the plug at predetermined intervals, said geared connection being such as to continue the rotation automatically through an arc of 120 degrees.

7. A water treating apparatus comprising a container closed at its top by a multiway valve having two casing ports communicating with the inside of the container, both adapted to serve as either inlet or outlet for the container, a plurality of other casing ports and a central rotatable circular plug having two peripheral channels formed therein, said plug channels being adapted, upon rotation of the plug through successive equal parts of a circle to connect two pairs of ports at a time, one of said pairs including one of the two inlet or outlet ports, the other including the other inlet or outlet port.

8. A multiway valve adapted to control the flow of liquid to and from a zeolite water softening bed, said valve comprising two casing ports connected respectively with the top and bottom of the zeolite bed, separate hard water, soft water, brine and waste ports in the casing, a circular rotatable member having a plurality of channels respectively adapted to connect different combinations of ports, an injector water inlet in said member adapted to receive water through one of the ports, an injector nozzle in the rotatable member communicating with said water inlet, an injector brine inlet adapted to connect the injector with the brine port and an injector discharge passage in the valve adapted to deliver liquid to the top of the zeolite bed.

9. In a water softener, a zeolite bed in a container connected at top and bottom to a multiway valve comprising a plurality of casing ports and a rotatable valve member having formed therein a plurality of passages, said ports and passages being adapted to connect the zeolite bed successively for softening, washing and regenerating as the member is rotated through three equal angles of a complete circle, a valve stem on said member and a gearing connecting the valve stem to a motor, said gearing comprising a driving gear meshing with a cut-out driven gear adapted to rotate the valve member through an angle of 120 degrees for each complete rotation of said driven gear and means for turning the cut-out driven gear into mesh with the driving gear.

10. In water treating apparatus having a treatment chamber controlled by turning a multiway valve to a plurality of successive positions, a gearing for turning the valve which comprises a driving gear on a rotatable shaft, a driven gear meshing with the driving gear and connected to the valve stem, said driven gear having a cut-out section without teeth, means for periodically turning the cut-out driven gear into mesh with the driving gear and power driven means for timing said turning means.

11. In water treating apparatus, a closed container with a cover member forming a part of the container casing and having two openings formed therein to provide an inlet and an outlet for the container, one of said openings communicating directly with the inside of the container at the top, the other opening being connected with the inside of the container near the bottom through an internal pipe attached to the container cover member at said opening, and directly attached to the container cover member a multiway valve having two casing ports constantly registering respectively with said two openings of the cover member and having other casing ports communicating respectively with a water supply pipe, a service pipe, and a drain pipe and a movable valve member having passages formed therein for establishing communication through said cover member openings between the inside of the container and said supply, service and drain pipes.

12. In water treating apparatus, a closed water treating chamber with a top head having two openings formed therein both adapted to form either inlet or outlet for said chamber, one of said openings communicating directly with the chamber at the top, the other opening being connected with the inside of the chamber near the bottom by an internal pipe connected to the top head of the chamber separately and independently of the first named opening, said top head having attached thereto a multiway valve having two ports communicating respectively with said top head openings and other ports connected to other lines including supply, service and waste lines, said valve having also a rotatable member with passages therein adapted to connect the treating chamber through the valve ports with said other lines for a plurality of successive operations in said chamber upon rotation of said member intermittently and successively through equal parts of a complete circle.

13. In water treating apparatus, a closed water treating chamber with a top head having two openings formed therein both adapted to form either inlet or outlet for said chamber, one of said openings communicating directly with the chamber at the top, the other opening being connected with the inside of the chamber near the bottom by an internal pipe connected to the top head of the chamber separately and independently of said first named opening, said top head having attached thereto a multiway valve having two ports communicating respectively with said top head openings and other ports connected to other lines including supply, service and waste lines, said valve having also a rotatable member with passages therein adapted to connect the treating chamber through the valve ports with the other lines for three successive operations upon rotation of the plug successively through three angles of 120 degrees.

14. A water treatment apparatus comprising a treatment tank, pipes for passing liquids to and from said tank, a multiway valve common to said pipes and having ports connected with said pipes and a rotatable member adapted to make three or more successive connections through said ports for a cycle of successive operations in said tank in being turned intermittently through three or more equal parts of a complete circle, a rotary motor arranged to rotate continuously in effecting said successive connections, and a gearing and a timing mechanism adapted to establish and disestablish operative connection at controlled time intervals between the motor and said rotatable valve member, said gearing including a set of gears having a driving member and a driven member geared in a ratio corresponding to the number of said equal parts of a circle so that each complete revolution of the driving member by the motor turns said valve member automatically through one of said equal parts of a circle.

15. A water treating apparatus comprising a treatment tank, pipes for passing liquids to and from said tank, a multiway valve common to said pipes and having ports connected with said pipes and a rotatable member adapted to make three successive connections through said ports for a cycle of successive operations in said tank in being turned intermittently through three equal parts of a complete circle, a rotary motor arranged to rotate continuously in effecting said successive connections and a gearing and a timing mechanism adapted to establish and disestablish operative connection at controlled time intervals between the motor and said rotatable valve member, said gearing including a set of gears having a driving member and a driven member geared in a 1:3 ratio so that each complete revolution of the driving member by the motor turns said valve member automatically through an angle of 120 degrees.

16. In water treating apparatus having a treatment tank and a rotatable valve mechanism adapted to make successive connections for a cycle of different operations in said tank, means for intermittent operation of the valve mechanism comprising an electric motor arranged to operate continuously during said cycle, speed reducing gearing associated with said motor, means in said speed reducing gearing for successively establishing and disestablishing a driving connection between said motor and the valve mechanism during continued operation of the motor and means for so controlling said driving connection that said successive valve connections are made intermittently and automatically.

17. In water treating apparatus having a rotatable valve mechanism adapted to make connections for a cycle of operations upon being rotated through equal angles of a complete circle, a motor operating continuously during said cycle with intermittent gearing adapted to turn said valve mechanism at intervals through each of said equal angles and with additional gearing adapted to control said intermittent gearing for automatically determining the respective intervals of time between said turnings.

18. A water treating apparatus comprising a treatment tank, connections for passing liquids to and from said tank, a multiway valve for controlling the flow through said connections, a constant speed motor for periodically positioning said multiway valve through a speed reducer, timing means also driven by said motor through a second speed reducer of a ratio different from that of said first mentioned speed reducer, said timing means being adapted to cause positioning of said multiway valve by the motor after predetermined periods of time subsequent to starting of the motor.

19. A water treating apparatus comprising a treatment tank, a rotatable valve mechanism adapted to make connections for passing liquids to and from said tank and motor driven means for rotating said valve mechanism including means for starting said rotation at a relatively low speed and also including other means for continuing said rotation at a relatively higher speed.

20. An automatic water treating apparatus adapted at once to operation either by a motor or by hand and comprising a treatment tank with a rotatable valve mechanism adapted to make connections for passing liquids to and from said tank, manually operable means for positioning said valve mechanism, motor-operated means for operating said valve positioning means and intermediate pin and pawl mechanism attaching said motor-operated means to said manually operable means in a fixed relation, said attaching mechanism being adapted to become automatically inoperative upon manual operation of the valve mechanism.

21. An automatic motor-operated water treating apparatus adapted to manual operation thereof and comprising a treatment tank with a rotatable valve mechanism adapted to make connections for passing liquids to and from said tank, means for positioning said valve mechanism, motor-operated means for operating said valve positioning means, manually operable means for operating said valve positioning means and intermediate means for attaching said motor-operated means to said manually operable means in a fixed relation, said attaching means being adapted to become automatically detached from the manually operable means upon manual operation of the valve mechanism when the motor-operated means is stopped and to become automatically attached thereto upon operation of said motor-operated means.

22. In water treating apparatus comprising a treatment tank with connections for passing liquids to and from said tank and a multiway valve common to said connections, valve positioning means, a motor-driven control mechanism for operating said valve positioning means, manually operable means for operating said valve positioning means and means automatically establishing a fixed relation between said control mechanism and said manual operating means by operation of the motor-driven control mechanism.

23. In zeolite water softening apparatus having a softening chamber and a source of brine supply, a multiway valve adapted to control the flow of liquid to and from the softening chamber, said valve comprising a casing with two ports connected respectively with top and bottom of the softening chamber, other ports in the valve casing connected respectively with hard water supply, soft water service, brine supply and waste, a flat stationary port plate in the casing having openings communicating with the various casing ports and an opening forming an injector inlet nozzle, an injector discharge nozzle formed in the casing co-axial with said inlet nozzle and formed with a brine inlet passage adapted to admit brine from the brine port upon flow of water through the injector nozzles, said discharge nozzle being in communication with one of the chamber ports, and a flat valve member rotatable on the port plate and having formed therein passages adapted upon rotation of the member to connect the casing ports through the port plate openings in different combinations and to admit hard water to the injector inlet nozzle.

24. In zeolite water softening apparatus having a softening chamber and a source of brine supply, a multiway valve adapted to control the flow of liquid to and from the softening chamber, said valve comprising a casing having a plurality of ports located on a flat face and connected respectively with top and bottom of the softening chamber, with a hard water supply pipe, with a soft water service pipe, with the source of brine supply and with a waste pipe, an injector in the valve adapted to discharge into the top of the softening chamber, a flat valve member rotatable upon the flat face of the casing, passages in the valve member adapted to connect different combinations of ports successively upon rotation of the valve member, said passages including two which in one position of the valve member respectively connect the hard water supply port with the injector and the injector with the brine supply port, another of said passages being adapted in said position of the valve member to connect the softening chamber bottom port with the waste pipe port.

ERIC PICK.